United States Patent [19]

Goto

[11] Patent Number: 4,871,493
[45] Date of Patent: Oct. 3, 1989

[54] PROCESS AND APPARATUS FOR EXTRUSION OF THERMOPLASTIC RESIN FILMS

[75] Inventor: Sumio Goto, Oita, Japan

[73] Assignee: Showa Denko Kabushiki Kaisha, Tokyo, Japan

[21] Appl. No.: 178,745

[22] PCT Filed: Jul. 10, 1987

[86] PCT No.: PCT/JP87/00493
§ 371 Date: Mar. 10, 1988
§ 102(e) Date: Mar. 10, 1988

[87] PCT Pub. No.: WO88/00522
PCT Pub. Date: Jan. 28, 1988

[30] Foreign Application Priority Data

Jul. 10, 1986 [JP] Japan .................. 61-160794

[51] Int. Cl.$^4$ .............. B29C 47/92; B29C 47/86; B29D 7/01
[52] U.S. Cl. ................... 264/40.6; 264/40.1; 264/176.1; 425/141; 425/144; 425/170; 425/379.1
[58] Field of Search .......... 264/40.1, 40.6, 40.2, 264/144, 176.1; 425/141, 143, 144, 170, 379.1

[56] References Cited

U.S. PATENT DOCUMENTS

| | | | |
|---|---|---|---|
| 3,341,388 | 9/1967 | Bunyea | 425/141 |
| 3,761,553 | 9/1973 | Richardson | 425/141 |
| 3,883,279 | 5/1975 | Heyer | 425/141 |
| 4,409,160 | 10/1983 | Kogo et al. | 264/40.1 |
| 4,426,239 | 1/1984 | Upmeier | 264/40.1 |
| 4,454,084 | 6/1984 | Smith et al. | 264/40.1 |

FOREIGN PATENT DOCUMENTS 95768 8/1977 Japan .

Primary Examiner—James Lowe
Attorney, Agent, or Firm—Sughrue, Mion, Zinn, Macpeak & Seas

[57] ABSTRACT

In preparing a film by extruding a molten thermoplastic resin, a heater in which a temperature profile varying in the width direction can be set is arranged in the width direction in the vicinity of a die lip, and a temperature sensor for detecting a resin temperature profile in the vicinity of the outlet of the die lip and a sensor capable of detecting a thickness profile of a film or the like in the width direction are disposed. The output of the heater is controlled according to signals from the temperature sensor and thickness sensor to automatically adjust the thickness of the film or the like in the width direction, whereby a homogeneous film with a reduced thickness unevenness can be stably prepared with a high precession of control of the thickness unevenness.

8 Claims, 1 Drawing Sheet

PROCESS AND APPARATUS FOR EXTRUSION OF THERMOPLASTIC RESIN FILMS.

DESCRIPTION

1. TECHNICAL FIELD

The present invention relates to a process and apparatus for the preparation of thermoplastic resin films by extruding a molten thermoplastic resin onto a surface of a cooling roll from a die, in which a homogeneous film with a reduced thickness unevenness is stably formed (in the instant specification, the term "film" is used in a broad sense to include not only an ordinary film but also a sheet, a foil and the like).

2. BACKGROUND ART

As the conventional process for the preparation of a thermoplastic resin film, a process is known in which a molten thermoplastic resin is extruded in the form of a film from a T-die and the extrudate is cooled and solidified by a cooling roll.

This process, however, is defective in that the flow quantity of the molten resin per unit length in the width direction of the die varies and, therefore, thickness unevenness often occurs in the width direction of the film.

As the means for reducing the thickness unevenness in the width direction of the film, a process is known in which the gap of a resin flow route is mechanically changed by utilizing the thermal expansion of a metal (see Catalogue of Measurex Japan Ltd., Feb. 27, 1986). However, in this process, since the expansion and contraction of the metal and distortions of the lip portion are utilized for controlling the thickness unevenness, the precision of control of the thickness unevenness is unsatisfactory.

DISCLOSURE OF THE INVENTION

It is an object of the present invention to solve the above-mentioned problems and provide a process and apparatus in which a homogenous film having a reduced thickness unevenness can be stably prepared with high precision of control of the thickness unevenness.

In accordance with one aspect of the present invention, there is provided a process for preparing a film of a thermoplastic resin by extruding a molten thermoplastic resin onto the surface of a cooling roll from a die, characterized in that a heater in which a temperature profile varying in the width direction can be set is arranged in the width direction in the vicinity of a die lip, a temperature sensor for detecting a resin temperature profile in the vicinity of the outlet of the die lip and a thickness sensor capable of detecting a thickness profile in the width direction of a film are disposed, and the output of said heater is controlled according to signals from the temperature sensor and thickness sensor, whereby the thickness of the film in the width direction is automatically adjusted.

In accordance with another aspect of the present invention, there is provided an apparatus for the preparation of thermoplastic resin films, which comprises a die for extruding a molten thermoplastic resin and at least one cooling roll for cooling a resin film extruded in the molten state from said die, said apparatus further comprising (a) a heater which is arranged in the vicinity of a die lip of said die and in which a temperature profile varying in the width direction of the film can be set, (b) a temperature sensor for detecting a resin temperature profile in the vicinity of the outlet of said die lip, (c) a thickness sensor capable of detecting a thickness profile in the width direction of the film and (d) a controller for controlling the output of said heater while receiving signals from said thickness sensor and temperature sensor, wherein the thickness in the width direction of the film can be automatically adjusted.

BEST MODE FOR CARRYING OUT THE INVENTION

Figure 1:
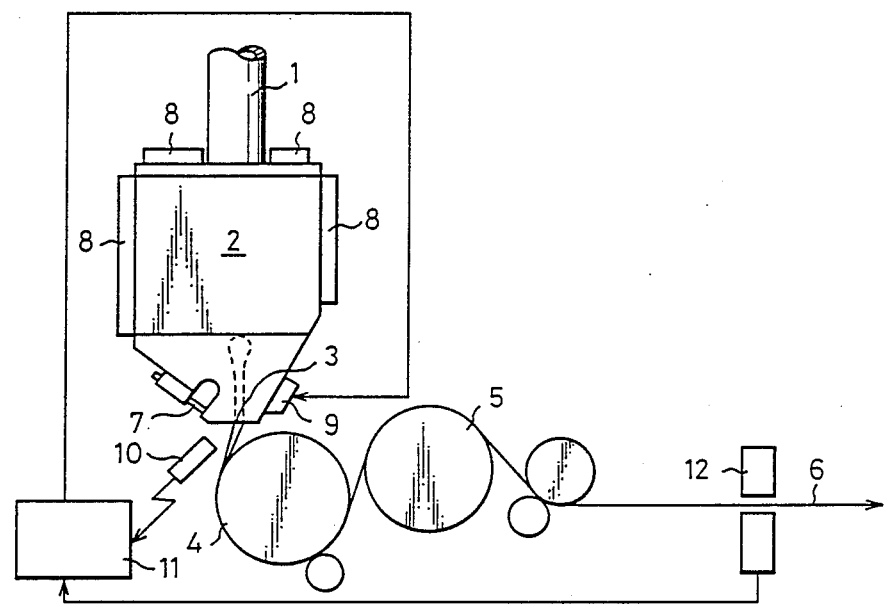
FIG. 1 is a diagram showing the structure of an apparatus for the preparation of thermoplastic resin films, which is used in carrying out one embodiment of the present invention.

The present invention will now be described in detail with reference to the accompanying drawings. Referring to FIG. 1, a thermoplastic resin molten and kneaded in an extruder (not shown) flows into a die 2 through a joint 1 and is extruded outside from a die lip 3, and the extrudate is taken out in the form of a film 6 through cooling rolls 4 and 5. A heater 8 is attached to the die 2 to maintain the entire die temperature at a constant level, and the heating temperature is detected by a thermocouple (not shown) or the like and adjusted by a temperature adjuster (not shown). Reference numeral 7 represents an adjusting bolt for changing the gap of a flow route, reference numeral 11 represents a controller, and reference numeral 12 represents a thickness sensor which is arranged downstream in the film-preparing process and is electrically connected to the controller 11. A thickness unevenness profile is measured by the thickness sensor 12 and the difference of this measured profile from an aimed profile is determined by the controller 11, and the flow route gap is changed through the adjusting bolt 7 or a thermally expansible body composed of a metal.

Figure 2:
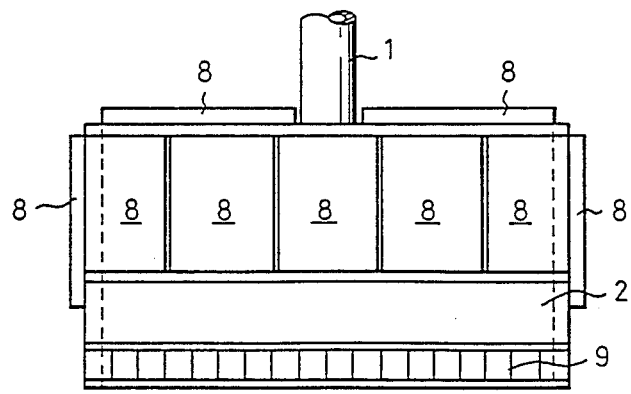
FIG. 2 is a diagram illustrating the structure of a die portion of said apparatus.

As is seen from FIG. 2, a heater 9 for controlling the thickness unevenness in the width direction is arranged in the vicinity of the die lip 3, and this heater 9 is electrically connected to the controller 11. Furthermore, a temperature sensor 10, such as an infrared ray sensor, arranged in the vicinity of the die lip 3 is electrically connected to the controller 11. The heater 9 has a structure in which an electrically heating system is adopted as the heat source and a temperature profile varying in the width direction can be set. In a preferred example of this structure, as shown in FIG. 2, the entirety (or at least a part) of the heater 9 is divided into a plurality (for example, 18 as shown in the drawings) of blocks in the die width direction, and the temperatures of respective blocks can independently set.

An aimed thickness unevenness profile is input to the controller 11 and an aimed temperature profile is calculated from the difference between this aimed thickness unevenness profile and the thickness unevenness profile measured by the thickness sensor 12.

The controller 11 supplies electricity to the heater 9 according to the aimed temperature of each block.

Electricity can be supplied by a triac or the like, and a method can be adopted in which the quantity of heat generated by the heater 9 is controlled by changing the voltage value or current value, and a method in which the quantity of generated heat is controlled by turning on and off the supply of electricity to the heater 9.

After the temperature of the heater 9 has been set, the temperature of the molten resin extruded from the die lip 3 is changed according to aimed temperatures of the respective blocks of the heater 9.

Since the resin temperature profile is often made different from the aimed temperature profile by the outer air temperature or because of mutual interference among the blocks, after the lapse of a certain time, in order to compensate the difference from the aimed profile, the controller 11 sets a corrected temperature for the heater 9 by referring to the signal from the temperature sensor 10. By repeating the above procedures, the molten resin temperature is brought close to the aimed profile.

When the resin temperature profile is close to the aimed temperature profile beyond a certain level, the controller 11 sets a new aimed temperature profile from the difference between the thickness unevenness profile measured by the thickness sensor 12 and the aimed thickness unevenness profile. By repeating the above procedures, the thickness unevenness profile is brought very close to the aimed thickness unevenness profile.

In the present invention, since the flow quantity of the resin from the die lip 3 is controlled by utilizing the change of the viscosity of the molten resin by the change of the temperature, the temperature of the outlet portion of the die lip 3 can be measured as the flow quantity of the resin, and since this temperature coincides with the thickness unevenness profile of the film 6 after cooling and solidification, the control precision is much improved over the precision attainable in the conventional automatic thickness unevenness-controlling method.

In the embodiment illustrated in the drawings, the thickness unevenness-controlling heater 9 is arranged along the entire width of the die, but since the selvedge portion of the film is not substantially used as a product, the heater 9 may be arranged only along an intermediate portion of the die width.

In the heater 9, preferably the block length in the die width direction is not larger than 50 mm, and especially preferably, the heater 9 is constructed so that the temperature can be independently adjusted in a plurality of blocks having a length of from 5 mm to 30 mm. If the length of each block of the heater 9 exceeds 50 mm, the precision of control of the thickness unevenness in the film is not satisfactory.

An electrically heating system is adopted as the heat source in the heater 9, and in order to maintain a uniform temperature in each block, preferably a metal having a good heat conductivity, especially aluminum, is used as the constructural material of the heater 9. As a typical example, there can be mentioned a known aluminum cast heater comprising aluminum having a good heat conductivity, which surrounds a heating element.

The distance of the heater 9 from the die lip 3 is a factor having an influence on the precision of control of the thickness unevenness of the film, and as this distance grows smaller, the response speed is increased and the precision is improved. In the present invention, preferably the distance of the heater 9 from the die lip 3 is not larger than 200 mm, especially not larger than 150 mm, particularly especially 5 to 100 mm. It is satisfactory if only a part of the heater 9 satisfies this distance requirement, and the other end of the heater 9 may be apart by more than 200 mm from the die lip 3.

Any of known thermoplastic resins customarily used for the formation of films can be used as the thermoplastic resin in the present invention. As typical examples, there can be mentioned polyolefins such as polyethylene and polypropylene, polyesters such as polyethylene terephthalate, vinyl polymers such as polystyrene, polyamides such as nylon 66 and nylon 6, and polycarbonates.

The drawings illustrate the structure of the apparatus used in one embodiment of the present invention, and various modifications can be made without departing from the scope of the invention.

For example, although preferably the temperature sensor 10 and thickness sensor 12 is arranged to scan in the die width direction, a method can be adopted in which many stationary sensors are used. An IR, $\beta$ ray, laser beam or electrostatic capacity type sensor is preferably used as the thickness sensor 12, but the kind of thickness sensor 12 is not particularly critical.

Moreover, a modification can be adopted in which a choke bar, a moving lip or a flexible lip is used in combination with the die 2 to perform a rough adjustment of the thickness unevenness of the film, and a fine adjustment is then carried out according to the process of the present invention.

(Examples)

The present invention will now be described in detail with reference to the following examples.

Examples 1 through 4 and Comparative Examples 1 through 3

Films of polyethylene and polypropylene were formed by using the apparatus shown in FIGS. 1 and 2.

In all of the examples and comparative examples, the base of the die 2 was a flexible type, the lip width was 1,500 mm, and the lip gap was 0.5 mm.

The temperature sensor 10 used in the examples was an infrared non-contact thermometer, and an aluminum cast electric heater was used as the heater 9. A $\beta$ ray type thickness sensor was used as the thickness sensor 12. Both the temperature sensor 10 and thickness sensor 12 were scanned in the die width direction to effect the measurement along the entire width of the film 6.

Example 1

| Shaping Conditions: | extruder temperature of 180 to 240° C., joint temperature of 240° C., die temperature of 240° C., resin temperature profile of from 240 + 4° C. to 240 − 0° C. |
|---|---|

Example 2

Shaping conditions were the same as those of Example 1 except the number of blocks of the heater 9.

Comparative Example 1

| Shaping Conditions: | extruder temperature of 180 to 240° C., joint temperature of 240° C., die temperature of 240° C. |
|---|---|

Examples 3 and 4

| Shaping Conditions: | extruder temperature of 180 to 200° C., joint temperature of 200° C., die temperature of |
|---|---|

-continued

| | |
|---|---|
| | 200° C., resin temperature profile of from 200 + 4° C. to 200 − 0° C. |

Comparative Example 2

| | |
|---|---|
| Shaping Conditions: | extruder temperature of 180 to 200° C., joint temperature of 200° C., die temperature of 200° C. |

Comparative Example 3

| | |
|---|---|
| Shaping Conditions: | extruder temperature of 180 to 200° C., joint temperature of 200° C., die temperature of 200° C., lip heater temperature of 204° C. |

The results obtained in the examples and comparative examples are shown in the following table.

| | Example 1 | Example 2 | Comparative Example 1 | Example 3 | Example 4 | Comparative Example 2 | Comparative Example 3 |
|---|---|---|---|---|---|---|---|
| Resin used | PP *1 | PP | PP | LDPE *2 | LDPE | LDPE | LDPE |
| Heater 9 | Disposed | Disposed | Not disposed | Disposed | Disposed | Not disposed | Lip heater |
| Block number of heater 9 | 30 | 60 | — | 60 | 60 | — | — |
| Length of each block of heater 9 (mm) | 50 | 25 | — | 25 | 25 | — | 1500 |
| Distance between heater 9 and outlet of die 2 (mm) | 100 | 100 | — | 150 | 20 | — | 100 |
| Average thickness of film 6 ($\mu$m) | 30 $\mu$ | 30 $\mu$ | 30 $\mu$ | 60 $\mu$ | 60 $\mu$ | 60 $\mu$ | 60 $\mu$ |
| Unevenness range of thickness of film 6 ($\mu$m) | 1.0 $\mu$ | 0.8 $\mu$ | 3 $\mu$ | 3 $\mu$ | 2.5 $\mu$ | 6 $\mu$ | 6 $\mu$ |
| Automatic control of thickness | Effected | Effected | Not effected | Effected | Effected | Effected | Effected |
| Automatic thickness control according to Present Invention | Effected | Effected | Not effected | Effected | Effected | Not effected | Not effected |

INDUSTRIAL APPLICABILITY

According to the present invention, a heater in which a temperature profile varying in the width direction can be set is arranged in the vicinity of a die lip in the width direction, and by using a temperature sensor for detecting a resin temperature profile in the vicinity of the outlet of the die lip and a thickness sensor capable of detecting a thickness profile in the width direction of a film or the like, the thickness in the width direction of heat film or the like is automatically adjusted. Therefore, according to the present invention, a film or the like having a reduced thickness unevenness can be stably supplied with a high precision of control of the thickness unevenness. When the so-formed film or the like is applied to a secondary step, for example, lamination or coating, the film or the like provides a product having a high commercial value.

I claim:

1. A process for preparing a film of a thermoplastic resin by extruding a molten thermoplastic resin onto the surface of a cooling roll from a die, wherein a heater in which a temperature profile varying in the width direction can be set is arranged in the width direction on the die in the vicinity of a die lip of the die, a temperature sensor for directly detecting a resin temperature profile in the vicinity of the outlet of the die lip is disposed in the vicinity of the die lip and apart from the die, and a thickness sensor capable of detecting a thickness profile in the width direction of a film is disposed, and the output of said heater is controlled according to signals from the temperature sensor and thickness sensor, whereby the thickness of the film in the width direction is automatically adjusted.

2. A preparation process according to claim 1, wherein a heater, a part or the entirety of which is divided into a plurality of blocks having a length not larger than 50 mm along the width direction of the die, is used as the heater.

3. A preparation process according to claim 1 or claim 2, wherein the heater is disposed so that the distance between the heater and the outlet of the die is not larger than 200 mm.

4. A preparation process according to claim 1 or claim 2, wherein aluminum is used as a heat conductor of the heater.

5. An apparatus for the preparation of thermoplastic resin films, which comprises a die for extruding a molten thermoplastic resin and at least one cooling roll for cooling a resin film extruded in the molten state from said die, said apparatus further comprising (a) a heater which is disposed on said die in the vicinity of a die lip of said die and in which a temperature profile varying in the width direction of the film can be set, (b) a temperature sensor for directly detecting a resin temperature profile in the vicinity of the outlet of said die lip, said temperature sensor being disposed in the vicinity of the outlet of the die lip and apart from the die, (c) a thickness sensor capable of detecting a thickness profile in the width direction of the film and (d) a controller for controlling the output of said heater while receiving signals from said thickness sensor and temperature sensor, wherein the thickness in the width direction of the film can be automatically adjusted.

6. A preparation apparatus according to claim 5, wherein a part or the entirety of the heater is divided into a plurality of blocks having a length not larger than 50 mm along the width direction of the die.

7. A preparation apparatus according to claim 5 or claim 6, wherein the heater is disposed so that the distance between the heater and the outlet of the die is not larger than 200 mm.

8. A preparation apparatus according to claim 5 or claim 6, wherein the heater comprises aluminum as a heat conductor.

* * * * *